United States Patent
Tanaka et al.

(10) Patent No.: US 10,723,304 B2
(45) Date of Patent: Jul. 28, 2020

(54) FRONT PILLAR STRUCTURE

(71) Applicant: TOYOTA JIDOSHA KABUSHIKI KAISHA, Toyota-shi (JP)

(72) Inventors: Ken Tanaka, Tougou-chou (JP); Yasuhiro Ito, Nisshin (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 5 days.

(21) Appl. No.: 16/235,575

(22) Filed: Dec. 28, 2018

(65) Prior Publication Data

US 2019/0233018 A1 Aug. 1, 2019

(30) Foreign Application Priority Data

Jan. 30, 2018 (JP) ................... 2018-013926

(51) Int. Cl.
| | |
|---|---|
| *B60R 21/213* | (2011.01) |
| *B62D 25/04* | (2006.01) |
| *B60R 21/215* | (2011.01) |
| *B60R 21/00* | (2006.01) |

(52) U.S. Cl.
CPC .......... *B60R 21/213* (2013.01); *B60R 21/215* (2013.01); *B62D 25/04* (2013.01); *B60R 2021/0048* (2013.01)

(58) Field of Classification Search
CPC ...... B62D 25/04; B60R 21/213; B60R 21/215
USPC .................................... 296/193.06
See application file for complete search history.

(56) References Cited

U.S. PATENT DOCUMENTS

| | | | |
|---|---|---|---|
| 6,199,941 B1* | 3/2001 | Takahara | ................ B60R 13/02 138/121 |
| 2012/0119531 A1* | 5/2012 | Osterhout | ........... B60R 13/0206 296/1.08 |
| 2017/0183039 A1 | 6/2017 | Toyota et al. | |
| 2017/0240122 A1* | 8/2017 | Terada | ..................... B60R 13/08 |
| 2018/0273102 A1* | 9/2018 | Komoriya | .............. B62D 25/04 |
| 2018/0273103 A1* | 9/2018 | Komoriya | ............ B62D 29/005 |
| 2018/0273104 A1* | 9/2018 | Ikeda | ..................... B62D 25/04 |
| 2018/0273106 A1* | 9/2018 | Ikeda | ........................ B60J 1/06 |

(Continued)

FOREIGN PATENT DOCUMENTS

| | | |
|---|---|---|
| JP | 3039981 U | 8/1997 |
| JP | 2006-273057 | 10/2006 |
| JP | 2017-114410 | 6/2017 |

*Primary Examiner* — Jason S Morrow
(74) *Attorney, Agent, or Firm* — Oblon, McClelland, Maier & Neustadt, L.L.P.

(57) ABSTRACT

A front pillar structure includes: a front frame member; a rear frame member; a transparent member, a front side of the transparent member being supported by the front frame member, and a rear side of the transparent member being supported by the rear frame member; a front interior decorative member covering the front frame member from a vehicle interior side; a rear interior decorative member covering the rear frame member from the vehicle interior side; a head protection airbag, at least part of which is stowed between the rear frame member and the rear interior decorative member; a cover disposed between a lower end portion of the front interior decorative member and a lower end portion of the rear interior decorative member, and a jutting-out portion jutting out from the lower end portion of the rear interior decorative member toward a lower face side of the cover.

4 Claims, 6 Drawing Sheets

(56) References Cited

U.S. PATENT DOCUMENTS

| | | | |
|---|---|---|---|
| 2019/0039553 A1* | 2/2019 | Komura | B22D 11/0657 |
| 2019/0126985 A1* | 5/2019 | Ikeda | B62D 25/04 |
| 2019/0126986 A1* | 5/2019 | Ikeda | B62D 29/005 |
| 2019/0144042 A1* | 5/2019 | Sakabe | B62D 25/04 296/203.02 |
| 2019/0152419 A1* | 5/2019 | Tanaka | B60R 21/04 |
| 2019/0161009 A1* | 5/2019 | Honma | B60R 1/00 |
| 2019/0217790 A1* | 7/2019 | Tanaka | B62D 25/04 |
| 2019/0217899 A1* | 7/2019 | Ikeda | B62D 25/04 |
| 2019/0217900 A1* | 7/2019 | Ikeda | B62D 25/04 |
| 2019/0225275 A1* | 7/2019 | Miura | B60J 1/06 |
| 2020/0062312 A1* | 2/2020 | Tanaka | B62D 25/04 |

\* cited by examiner

FRONT PILLAR STRUCTURE

CROSS-REFERENCE TO RELATED APPLICATION

This application claims priority under 35 USC 119 from Japanese Patent Application No. 2018-13926 filed Jan. 30, 2018, the disclosure of which is incorporated by reference herein in its entirety.

BACKGROUND

Technical Field

The present disclosure relates to a front pillar structure.

Related Art

Vehicle pillar structures have been proposed that include a front pillar (also referred to as an "A pillar" hereafter) inner panel, an A pillar frame provided opposing the A pillar inner panel, and an A pillar garnish (interior decorative member) provided at a vehicle interior side of the A pillar inner panel. The A pillar inner panel and the A pillar frame retain a transparent member (see, for example, Japanese Patent Application Laid-Open (JP-A) No. 2006-273057).

SUMMARY

Generally, a head protection airbag, that inflates and deploys in a curtain shape at a side section of the vehicle cabin at a time of a vehicle collision, is partially housed in a space formed between the A pillar inner panel and the A pillar garnish in a state prior to inflation and deployment.

There is accordingly a possibility that the A pillar garnish (interior decorative member) might separate and fly off into the vehicle cabin during inflation and deployment of the head protection airbag.

An object of the present disclosure is to obtain a front pillar structure capable of suppressing an interior decorative member from separating and flying off into a vehicle cabin during inflation and deployment of a head protection airbag.

A front pillar structure of a first aspect of the present disclosure includes a front frame member, a rear frame member, a transparent member, a front interior decorative member, a rear interior decorative member, a head protection airbag, a cover, and a jutting-out portion. The front frame member extends substantially along a vehicle vertical direction, and the rear cross member extends substantially along the vehicle vertical direction. The transparent member extends substantially along the vehicle vertical direction, a vehicle front-rear direction front side of the transparent member being supported by the front frame member, and a vehicle front-rear direction rear side of the transparent member being supported by the rear frame member. The front interior decorative member extends substantially along the vehicle vertical direction and covers the front frame member from a vehicle interior side. The rear interior decorative member extends substantially along the vehicle vertical direction and covers the rear frame member from the vehicle interior side. The head protection airbag, at least part of which is stowed between the rear frame member and the rear interior decorative member, the head protection airbag is inflated and deployed in a curtain shape at a side section of a vehicle cabin due to gas being supplied at a time of a vehicle collision. The cover is disposed between a lower end portion of the front interior decorative member and a lower end portion of the rear interior decorative member, the cover is configured to form part of an instrument panel. The jutting-out portion is provided so as to jut out from the lower end portion of the rear interior decorative member toward a lower face side of the cover.

In the front pillar structure of the first aspect, the jutting-out portion is provided so as to jut out from the lower end portion of the rear interior decorative member toward the lower face side of the cover. Thus, when the head protection airbag inflates and deploys and the rear interior decorative member deforms, the jutting-out portion is caught at the cover, and the lower end portion of the rear interior decorative member is prevented from moving. The rear interior decorative member is thereby suppressed from flying off into the vehicle cabin.

A front pillar structure of a second aspect of the present disclosure is the front pillar structure of the first aspect, wherein the jutting-out portion is formed with a substantially L-shaped profile in side view as viewed along a vehicle width direction.

In the front pillar structure of the second aspect, the jutting-out portion is formed with a substantially L-shaped profile in side view as viewed along the vehicle width direction. The jutting-out portion is thereby hooked more easily onto the cover, and the lower end portion of the rear interior decorative member is better prevented from moving than in cases in which the jutting-out portion is not formed with a substantially L-shaped profile in side view as viewed along the vehicle width direction. This further suppresses the rear interior decorative member from flying off into the vehicle cabin.

A front pillar structure of a third aspect of the present disclosure is the front pillar structure of either the first aspect or the second aspect, wherein the rear interior decorative member is formed with a substantially U-shaped profile opening toward a vehicle width direction outer side in plan view cross-section, and the jutting-out portion juts out from a vehicle width direction outer end portion at a vehicle front of the rear interior decorative member.

In the front pillar structure of the third aspect, the jutting-out portion juts out from the vehicle width direction outer end portion at the vehicle front of the rear interior decorative member. Thus, the jutting-out portion is more firmly hooked onto the cover, and the lower end portion of the rear interior decorative member is better prevented from moving than in cases in which the jutting-out portion juts out from a vehicle width direction inner end portion at the vehicle front of the rear interior decorative member. This further suppresses the rear interior decorative member from flying off into the vehicle cabin.

The front pillar structure of the first aspect enables the interior decorative member to be suppressed from separating and flying off into the vehicle cabin during inflation and deployment of the head protection airbag.

The front pillar structures of the second aspect and the third aspect enable the interior decorative member to be further suppressed from separating and flying off into the vehicle cabin during inflation and deployment of the head protection airbag.

BRIEF DESCRIPTION OF THE DRAWINGS

Preferred embodiments will be described in detail based on the following figures, wherein.

DETAILED DESCRIPTION

Detailed explanation follows regarding an exemplary embodiment according to the present disclosure, with reference to the drawings. To aid explanation, in each of the drawings, the arrow UP indicates a vehicle upward direction, the arrow FR indicates a vehicle front direction, and the arrow OUT indicates a vehicle width direction outer side, as appropriate. In the following explanation, unless specifically stated otherwise, reference to up and down, front and rear, and left and right directions refer to up and down in a vehicle vertical direction, front and rear in a vehicle front-rear direction, and left and right in a vehicle left-right direction (vehicle width direction).

Figure 1:
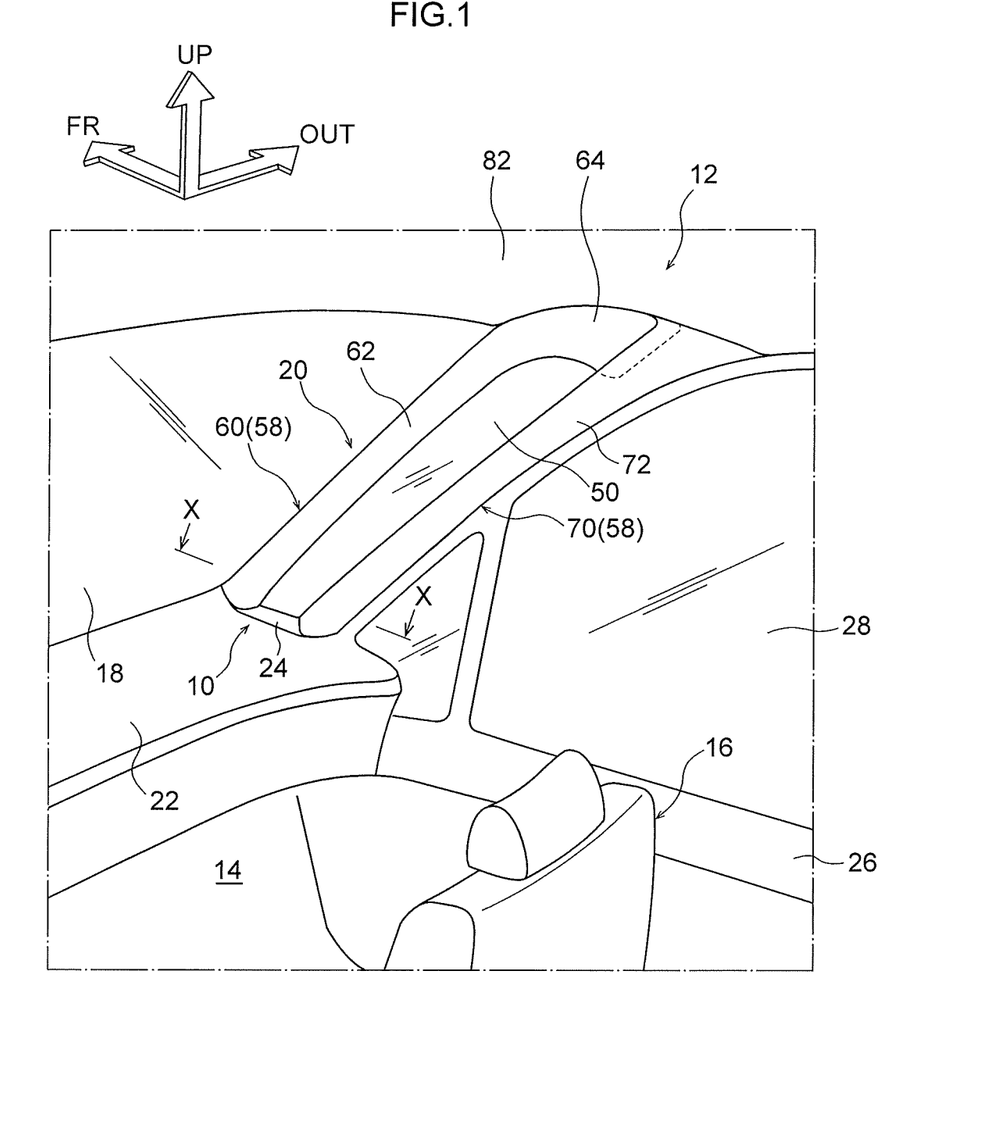
FIG. 1 is a schematic perspective view illustrating an interior of a vehicle cabin of a vehicle provided with a front pillar structure according to an exemplary embodiment.

As illustrated in FIG. 1, a pair of left and right vehicle seats 16 are provided at a vehicle front of an interior of a vehicle cabin 14 of a vehicle 12 applied with a front pillar structure 10 according to the present exemplary embodiment. Note that in the present exemplary embodiment, the vehicle 12 is configured as a left-hand drive vehicle as an example, and illustration of the driving seat 16, on which a driver sits, is omitted in FIG. 1.

Windshield glass 18 is provided at the vehicle front of the vehicle seats 16. The windshield glass 18 partitions the interior of the vehicle cabin 14 from an exterior of the vehicle cabin 14, and is a transparent window member with a pane thickness direction running substantially along the vehicle front-rear direction. In side view, the windshield glass 18 is inclined toward a vehicle rear on progression toward a vehicle upper side.

An upper end portion of the windshield glass 18 is connected to a front header (not illustrated in the drawings) configuring a front end portion of a roof configured including a roof panel (not illustrated in the drawings). A lower end portion of the windshield glass 18 is disposed opposing a rear end portion of a hood (not illustrated in the drawings) in the vehicle front-rear direction, and is connected to a cowl (not illustrated in the drawings) extending along the vehicle width direction. The hood covers a power unit compartment, provided at the front of the vehicle, from a vehicle upper side.

The windshield glass 18 is formed with a uniform pane thickness, and a vehicle width direction intermediate portion of the windshield glass 18 has a gently curving profile so as to protrude toward the vehicle front. A pair of left and right front pillars (referred to hereafter as "A pillars") 20 are provided at vehicle width direction outer sides of the windshield glass 18, at vehicle fronts of front doors 26 that include front side windows 28.

The pair of left and right A pillars 20 extend along vehicle width direction outer end portions 18A of the windshield glass 18, and run with their length directions substantially along the vehicle vertical direction. Namely, the pair of left and right A pillars 20 are inclined toward the vehicle rear on progression toward the vehicle upper side. Note that both the A pillar 20 on a front passenger seat side and the A pillar 20 on the driving seat side have the same configuration, and so the following explanation deals with the A pillar 20 on the front passenger seat side.

Figure 3:
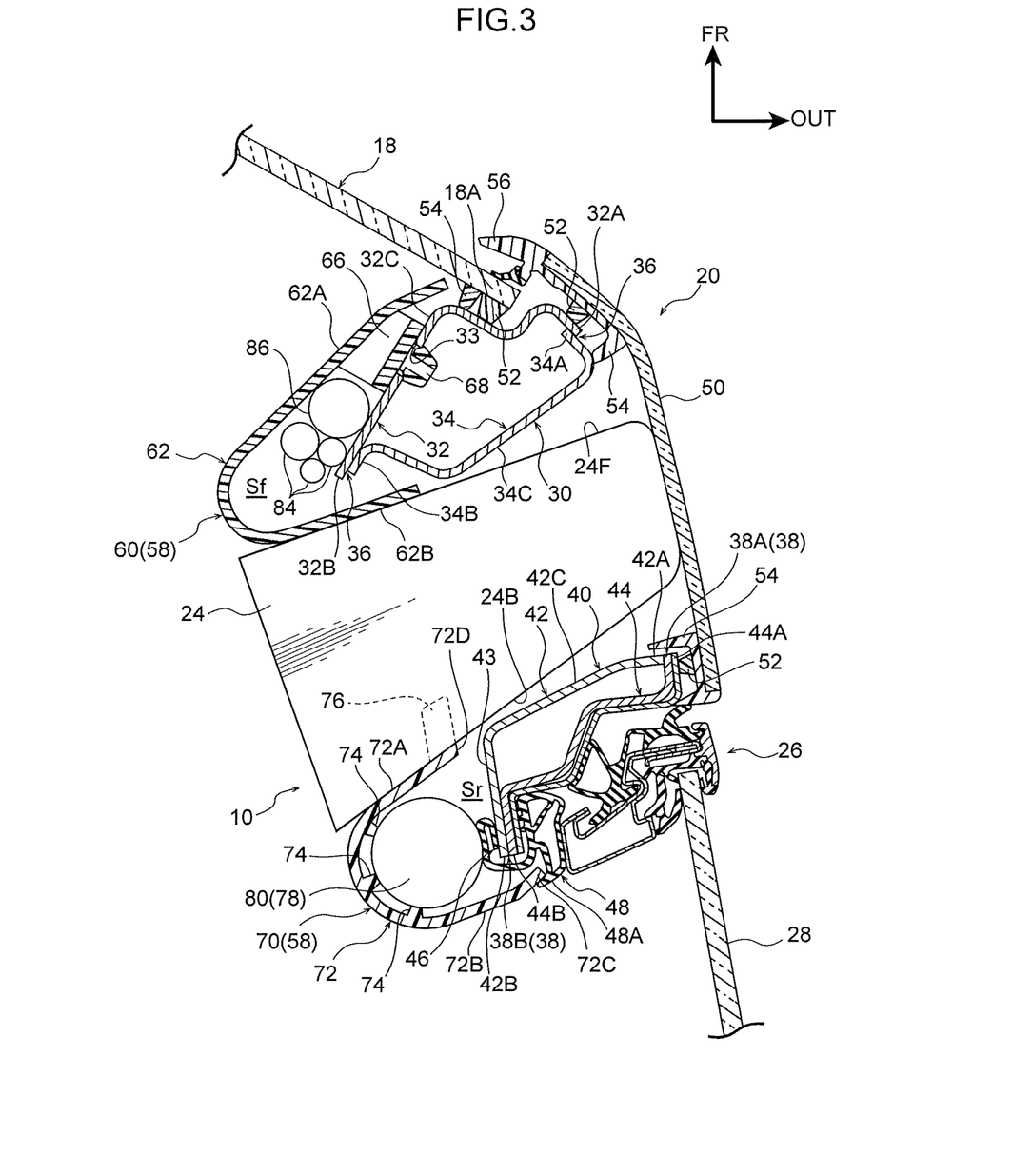
FIG. 3 is a cross-section taken along line X-X in FIG. 1.

As illustrated in FIG. 3, each A pillar 20 includes a first column 30, serving as a front frame member, and a second column 40, serving as a rear frame member. The first column 30 extends substantially in the vehicle vertical direction. The vehicle width direction outer end portion 18A of the windshield glass 18 is joined to the first column 30 using a urethane adhesive 52 and cushioning rubber 54.

The first column 30 is formed including a first pillar inner panel 32 made from sheet steel, and a first pillar outer panel 34, also made from sheet steel. The first pillar inner panel 32 has a substantially crank-shaped cross-section profile as sectioned orthogonally to the length direction of the first pillar inner panel 32 (an extension direction running substantially in the vehicle vertical direction). The first pillar outer panel 34 has a substantially U-shaped cross-section profile opening substantially toward the vehicle width direction inner side as sectioned orthogonally to the length direction of the first pillar outer panel 34 (an extension direction running substantially in the vehicle vertical direction), and forms a closed cross-section profile with the first pillar inner panel 32.

Namely, the first pillar inner panel 32 is provided opposing the first pillar outer panel 34 from substantially the vehicle front, and the first pillar outer panel 34 and the first pillar inner panel 32 are joined together at welds 36. Width direction (a direction orthogonal to the length direction) end portions 32A, 32B of the first pillar inner panel 32 are superimposed on and welded to width direction (a direction orthogonal to the length direction) end portions 34A, 34B of the first pillar outer panel 34 at the welds 36.

The second column 40 is disposed at substantially the vehicle rear of the first column 30. In other words, the second column 40 is disposed at a predetermined spacing away from the first column 30 in substantially the vehicle front-rear direction. The predetermined spacing is set to no greater than a distance between the centers of the pupils of the driver seated in the vehicle seat 16. The "distance between the centers of the pupils" refers to the distance between the center of the pupil of the right eye and the center of the pupil of the left eye of the driver, this being approximately 60 mm to 65 mm in the case of a Japanese adult. In the present exemplary embodiment, the predetermined spacing is set to 65 mm as an example.

The second column 40 extends so as to run substantially parallel to the first column 30 (substantially along the vehicle vertical direction), and is configured including a second pillar inner panel 42 made from sheet steel, and a second pillar outer panel 44, also made from sheet steel. The second pillar inner panel 42 has a substantially L-shaped cross-section profile as sectioned orthogonally to the length direction (an extension direction running substantially in the vehicle vertical direction). The second pillar outer panel 44 has a substantially crank-shaped cross-section profile as sectioned orthogonally to the length direction (an extension direction running substantially in the vehicle vertical direction), and forms a closed cross-section profile together with the second pillar inner panel 42.

Namely, the second pillar inner panel 42 is provided opposing the second pillar outer panel 44 from substantially the vehicle front, and the second pillar outer panel 44 and the second pillar inner panel 42 are joined at welds 38. A width direction (a direction orthogonal to the length direction) end portion 42A of the second pillar inner panel 42 is abutted against and welded to a width direction (a direction orthogonal to the length direction) end portion 44A of the second pillar outer panel 44 at a weld 38A at the vehicle width direction outer side.

A width direction (a direction orthogonal to the length direction) end portion 44B of the second pillar outer panel 44 is superimposed on and welded to a width direction (a direction orthogonal to the length direction) end portion 42B of the second pillar inner panel 42 at a weld 38B at the vehicle width direction inner side. An outer face of the end portion 42B of the second pillar inner panel 42 that faces toward the vehicle width direction inner side configures a flat face 43 that imparts a reaction force to a head protection airbag 80, described later, during inflation and deployment of the head protection airbag 80.

A location configuring the weld 38B on the vehicle width direction inner side, namely a location where the width direction end portion 42B of the second pillar inner panel 42 is superimposed on the width direction end portion 44B of the second pillar outer panel 44, configures a flange 46. An opening trim 48 is attached to the flange 46.

An A pillar outer glass 50, serving as a transparent member, is provided at substantially vehicle width direction outer sides of the first column 30 and the second column 40 so as to span therebetween, with urethane adhesive 52 and cushioning rubber 54 interposed between the A pillar outer glass 50 and the first column 30 and the second column 40. The A pillar outer glass 50 is a transparent window member with its pane thickness direction substantially in the vehicle width direction, and is inclined toward the vehicle rear on progression toward the vehicle upper side in side view (see FIG. 1).

A sealing member 56 is provided between the A pillar outer glass 50 and the windshield glass 18. The sealing member 56 prevents rainwater and the like from entering between the A pillar outer glass 50 and the windshield glass 18. The A pillar outer glass 50 is not limited to being configured from glass, and may, for example, be configured by a transparent carbon fiber-reinforced plastic.

Figure 2:
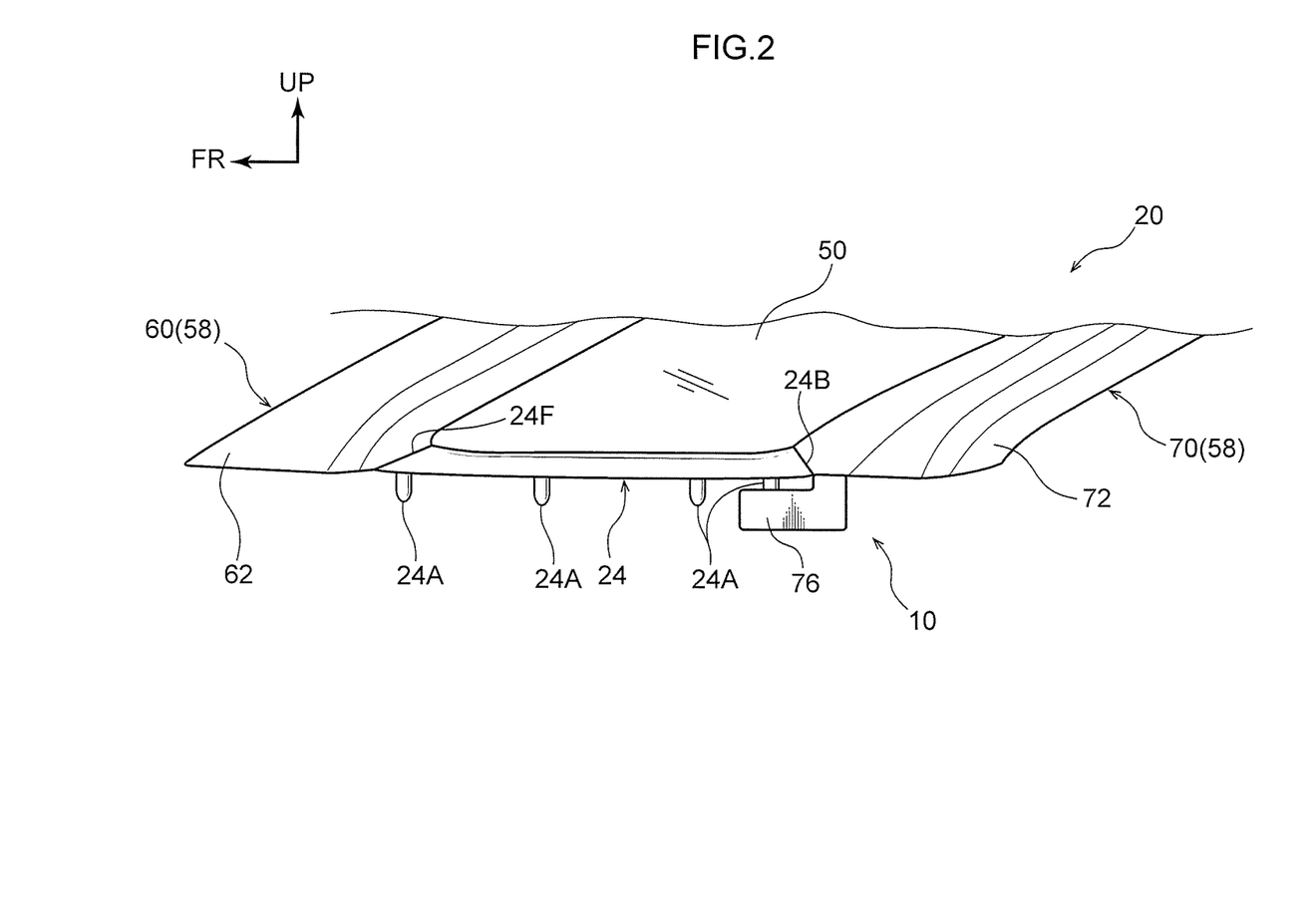
FIG. 2 is a schematic side view illustrating a front pillar structure according to an exemplary embodiment.

As illustrated in FIG. 1 to FIG. 3, an A pillar garnish 58 is provided at a vehicle width direction inner side of the first column 30 and the second column 40. The A pillar garnish 58 is configured from resin, and is configured including a front garnish 60, serving as a front interior decorative member provided at a vehicle interior side of the first column 30, and a rear garnish 70, serving as a rear interior decorative member provided at a vehicle interior side of the second column 40.

As illustrated in FIG. 1, the front garnish 60 includes a main body 62 that extends substantially in the vehicle vertical direction following the first column 30, and an extension portion 64 that is integrally provided to an upper end portion of the main body 62 and extends substantially toward the vehicle rear. A lower end portion of the main body 62 is inserted into an insertion opening (not illustrated in the drawings) formed at an instrument panel 22, and an upper end portion of the extension portion 64 abuts a roof headliner 82.

As illustrated in FIG. 3, the main body 62 of the front garnish 60 includes a first side wall 62A that covers the first pillar inner panel 32 from the vehicle front, and a second side wall 62B that opposes the first side wall 62A. The first side wall 62A and the second side wall 62B configure the main body 62 with a substantially U-shaped cross-section profile opening substantially toward the vehicle width direction outer side as sectioned orthogonally to the length direction (in plan view cross-section).

A housing space Sf is formed between the first side wall 62A and the first pillar inner panel 32. A wire harness 84 and a hose 86 are laid out inside the housing space Sf. The second side wall 62B is disposed close to the first pillar outer panel 34 without contacting the first pillar outer panel 34, and an outer face of the second side wall 62B that faces substantially toward the vehicle rear is disposed in substantially the same plane as an outer face 34C of the first pillar outer panel 34 that faces substantially toward the vehicle rear in plan view cross-section.

Plural clip mounts 66, and clips 68 attached to the respective clip mounts 66, are provided discretely from one another along the length direction of an inner face of the first side wall 62A. Each clip mount 66 is provided opposing an outer face 32C of the first pillar inner panel 32 that faces substantially toward the vehicle front. The clips 68 attached to the respective clip mounts 66 are inserted into through holes 33 formed at the first pillar inner panel 32, thereby attaching the front garnish 60 to the first column 30.

As illustrated in FIG. 1, the rear garnish 70 includes a main body 72 that extends substantially in the vehicle vertical direction following the second column 40. Similarly to the front garnish 60, a lower end portion of the main body 72 is inserted into an insertion opening (not illustrated in the drawings) formed at the instrument panel 22.

As illustrated in FIG. 3, the main body 72 of the rear garnish 70 includes a first side wall 72A that opposes the second side wall 62B of the main body 62 of the front garnish 60 substantially in the vehicle front-rear direction, and a second side wall 72B that opposes the first side wall 72A. The first side wall 72A and the second side wall 72B configure the main body 72 with a substantially U-shaped cross-section profile opening substantially toward the vehicle width direction outer side as sectioned orthogonally to the length direction of the main body 72 (in plan view cross-section).

The first side wall 72A is disposed close to the second pillar inner panel 42 without contacting the second pillar inner panel 42, and an outer face of the first side wall 72A that faces substantially toward the vehicle front is disposed in substantially the same plane as an outer face 42C of the second pillar inner panel 42 that faces substantially toward the vehicle front in plan view cross-section.

The second side wall 72B extends as far as the vehicle rear of the flange 46, and a vehicle width direction outer end portion 72C extending from the second side wall 72B is disposed at a position overlapping with a lip 48A of the opening trim 48 in the vehicle front-rear direction. Plural (for example three) ribs 74 are formed at locations between the first side wall 72A and the second side wall 72B of the main body 72 so as to project substantially toward the vehicle width direction outer side along the plate thickness direction of the main body 72.

Although not illustrated in the drawings, an upper portion of an inner face of the rear garnish 70 that corresponds to the extension portion 64 of the front garnish 60 is provided with a clip mount and a tether clip attached to the clip mount. The tether clip is inserted into a through hole (not illustrated in the drawings) formed at the second pillar inner panel 42 so as to attach the upper portion of the rear garnish 70 to the second column 40.

As illustrated in FIG. 1 to FIG. 3, a substantially rectangular flat plate shaped cover 24 (with a substantially trapezoidal profile in plan view) that configures part of the instrument panel 22 is disposed between a lower end portion of the front garnish 60 and a lower end portion of the rear garnish 70. As illustrated in FIG. 2, plural insertion portions 24A project from a lower face of the cover 24. The insertion portions 24A are inserted into a portion of the instrument panel 22 in order to provide the cover 24 to the instrument panel 22.

As illustrated in FIG. 2 and FIG. 3, a peripheral edge 24F at the vehicle front of the cover 24 is disposed so as to abut (or lie close to) the second side wall 62B of the main body 62 of the front garnish 60. A peripheral edge 24B at the vehicle rear of the cover 24 is disposed so as to abut (or lie close to) the first side wall 72A of the main body 72 of the rear garnish 70.

As illustrated in FIG. 3, in plan view, a peripheral edge at the vehicle width direction outer side of the cover 24 is disposed so as to lie close to (or abut) the A pillar outer glass 50. A peripheral edge at the vehicle width direction inner side of the cover 24 is, for example, disposed along an imaginary line (not illustrated in the drawings) linking between a vehicle width direction inner end portion of the main body 62 of the front garnish 60 and a vehicle width direction inner end portion of the main body 72 of the rear garnish 70.

As illustrated in FIG. 2 and FIG. 3, a lower end portion of the rear garnish 70 (main body 72) is integrally provided with a jutting-out portion 76 jutting out from the lower end portion of the rear garnish 70 toward a lower face side of the cover 24. The jutting-out portion 76 is formed with a substantially L-shaped profile in side view along the vehicle width direction, and juts out in a substantially rectangular shape from a vehicle width direction outer end portion 72D of the first side wall 72A in plan view.

Note that although the jutting-out portion 76 illustrated in the drawings is formed in a substantially L-shape in side view, and is formed in a substantially rectangular shape (oblong shape) elongated along the jutting-out direction in plan view, the shape of the jutting-out portion 76 is not particularly limited. The jutting-out portion 76 may, for example, be formed in a substantially semielliptical shape elongated along the jutting-out direction in plan view, as long as the jutting-out portion 76 has a shape that anchors to (hooks onto) the peripheral edge 24B at the vehicle rear of the cover 24.

As illustrated in FIG. 3, a head protection airbag device 78 includes the head protection airbag 80, a tension strap (not illustrated in the drawings), and an inflator (not illustrated in the drawings). The head protection airbag 80 inflates and deploys in a curtain shape along a side section of the vehicle cabin 14 when supplied with gas from the inflator at a time of a vehicle collision, such that the head protection airbag 80 covers the front side window 28 and a B pillar (center pillar, not illustrated in the drawings).

The head protection airbag 80 is usually folded up in an elongated shape and stowed together with the inflator in a roof side rail (not illustrated in the drawings) provided at an upper end portion of the side section of the vehicle cabin 14. More specifically, when folded up in an elongated shape, the head protection airbag 80 extends along the roof side rail from a length direction substantially intermediate portion of the second column 40 of the A pillar 20 to an upper end of a C pillar (rear pillar, not illustrated in the drawings).

The part of the head protection airbag 80 that is disposed along the second column 40 is stowed inside a housing space Sr formed between the rear garnish 70 and the second column 40, in a state in abutting leading end portions of the plural ribs 74 that are formed at the rear garnish 70.

Explanation follows regarding operation of the front pillar structure 10 according to the present exemplary embodiment configured as described above.

When an airbag sensor (not illustrated in the drawings) detects a collision of the vehicle 12 and outputs a collision signal to a controller (not illustrated in the drawings) and the controller determines it to be necessary based on the input collision signal, the controller passes a predetermined current through the inflator. This causes the inflator to actuate, such that gas flows into the head protection airbag 80 that is in a folded state.

Figure 4:
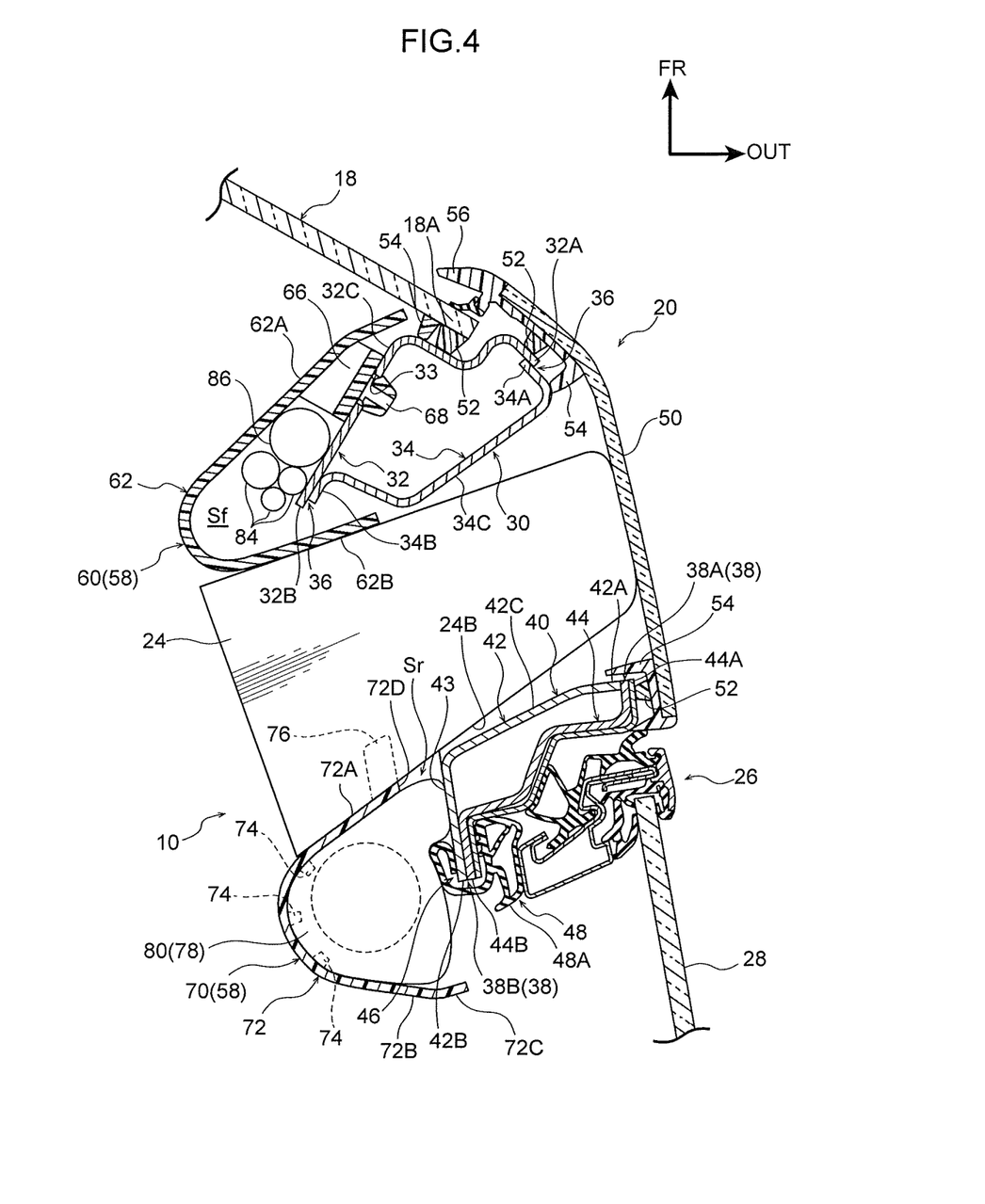
FIG. 4 is a cross-section corresponding to FIG. 3, illustrating an initial state during inflation and deployment of a head protection airbag.

When this occurs, as illustrated in FIG. 4, during initial inflation of the head protection airbag 80, the head protection airbag 80 receives a reaction force from the flat face 43 of the second pillar inner panel 42 of the second column 40, thereby transmitting deployment load to the rear garnish 70. The upper portion of the rear garnish 70 (main body 72) corresponding to the extension portion 64 of the front garnish 60 accordingly moves away (separates) from the second column 40 within a range permitted by the tether clip.

The lower end portion of the rear garnish 70 is provided with the jutting-out portion 76 that juts out toward the lower face of the cover 24. Accordingly, when the lower portion of the rear garnish 70 (main body 72) attempts to move away from the second column 40, the jutting-out portion 76 anchors to (hooks onto) the cover 24 (peripheral edge 24B), and the first side wall 72A at the lower end portion of the rear garnish 70 (main body 72) is prevented from moving toward the vehicle front.

Namely, a lower end portion of the first side wall 72A is retained in an inserted state in the insertion opening of the instrument panel 22, and the second side wall 72B of the main body 72 of the rear garnish 70 is pushed apart in a direction away from the first side wall 72A by the inflating and deploying head protection airbag 80.

Figure 5:
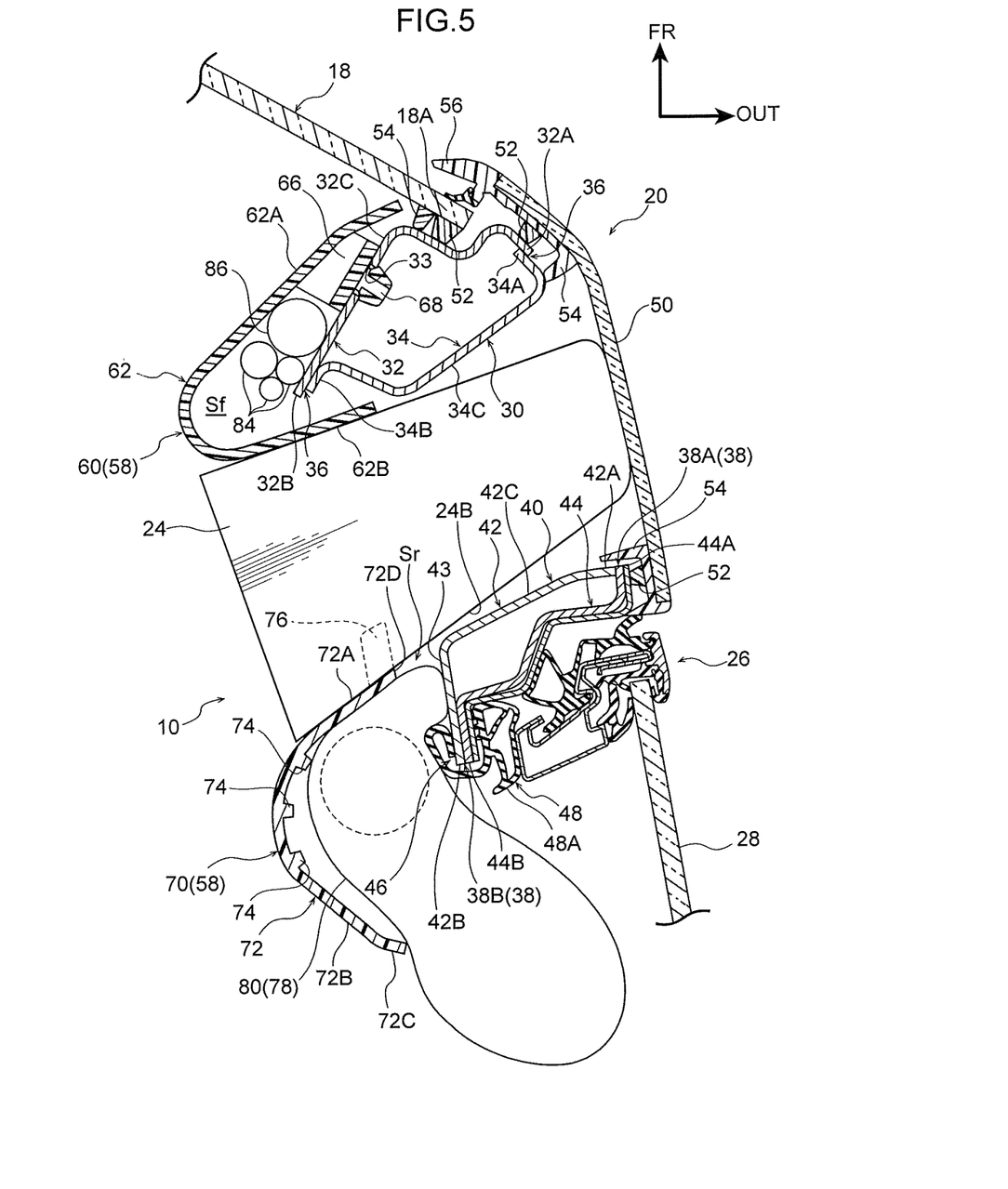
FIG. 5 is a cross-section corresponding to FIG. 3, illustrating an intermediate state during inflation and deployment of a head protection airbag.

Next, as illustrated in FIG. 5, accompanying inflation and deployment of the head protection airbag 80 toward the vehicle interior side through a gap between the rear garnish 70 and the second column 40, the second side wall 72B is pushed further apart in the direction away from the first side wall 72A.

Figure 6:
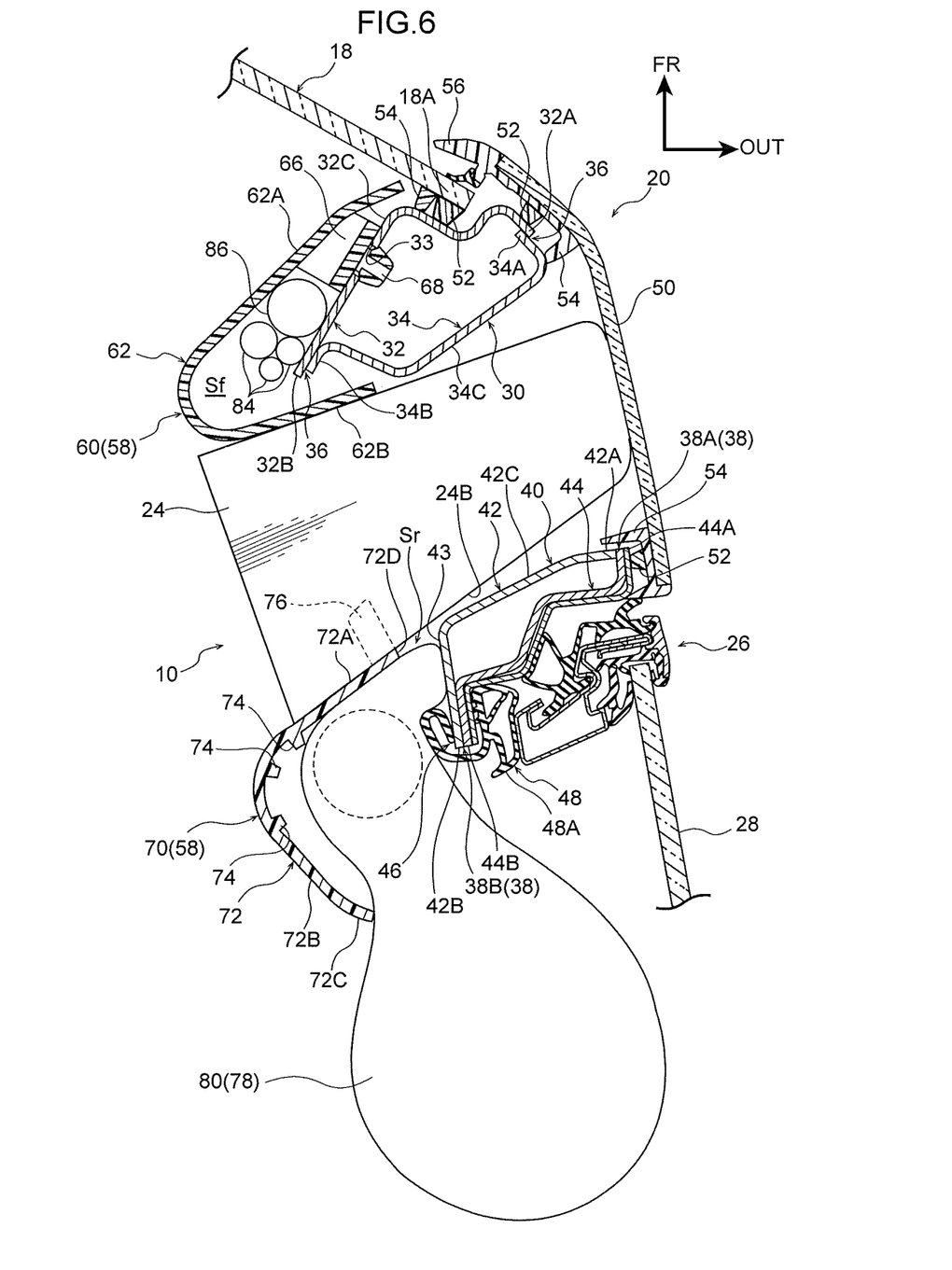
FIG. 6 is a cross-section corresponding to FIG. 3, illustrating a final state during inflation and deployment of a head protection airbag.

As illustrated in FIG. 6, the head protection airbag 80 then inflates and deploys in a curtain shape toward the vehicle cabin 14, while causing the second side wall 72B to retreat substantially toward the vehicle width direction inner side. This completes the inflation and deployment of the head protection airbag 80. As described above, the upper portion of the rear garnish 70 is attached to the second column 40 using the tether clip.

Moreover, the jutting-out portion 76 is anchored to (hooked onto) the cover 24 (peripheral edge 24B), thereby preventing the lower end portion of the first side wall 72A (lower portion of the rear garnish 70) from moving substantially toward the vehicle front. Namely, on completion of inflation and deployment of the head protection airbag 80, the lower end portion of the rear garnish 70 is suppressed or prevented from separating from the instrument panel 22.

Accordingly, even though the rear garnish 70 deforms and the upper portion side of the rear garnish 70 moves away (separates) from the second column 40 during inflation and deployment of the head protection airbag 80, this moved-away state is retained, suppressing or preventing the rear garnish 70 from flying off into the vehicle cabin 14. In other words, the rear garnish 70 is suppressed or prevented from falling off the second column 40 (A pillar 20).

The front pillar structure 10 according to the present exemplary embodiment facilitates assembly of the rear garnish 70. More specifically, for example, if the lower portion of the rear garnish 70 were also configured so as to be attached to the second column 40 by a tether clip, there would be a concern that the rear garnish 70 would be unable to attach using the tether clip, if a manufacturing error arose in the positions of the through holes at the lower portion side and the upper portion side of the second column 40 (second pillar inner panel 42) for attaching the tether clip.

However, in the present exemplary embodiment, the tether clip is only employed at the upper portion side, and the jutting-out portion 76 is provided jutting out to the lower face of the cover 24 at the lower portion side of the rear garnish 70, enabling easy assembly of the rear garnish 70. Note that during assembly of the A pillar garnish 58, the front garnish 60, the rear garnish 70, and the cover 24 are assembled in this sequence, and the latch structure between the cover 24 and the jutting-out portion 76 enables the rear garnish 70 to be thoroughly suppressed or prevented from falling using a simple configuration.

Forming the jutting-out portion 76 with a substantially L-shaped profile in side view enables the jutting-out portion 76 to be anchored more easily (hooked more easily) to the cover 24 (peripheral edge 24B) than in cases in which the jutting-out portion 76 is not formed with a substantially L-shaped profile in side view. This thereby enables the lower portion of the rear garnish 70 to be better prevented from moving substantially toward the vehicle front, thus enabling the rear garnish 70 to be further suppressed or prevented from flying off (falling) into the vehicle cabin 14.

The jutting-out portion 76 juts out from the vehicle width direction outer end portion 72D of the first side wall 72A of the main body 72 of the rear garnish 70, such that the jutting-out portion 76 anchors more firmly to (hooks more reliably onto) the cover 24 (peripheral edge 24B) than in cases in which, for example, the jutting-out portion 76 juts out from a vehicle width direction inner end portion of the first side wall 72A. This thereby enables the lower portion of the rear garnish 70 to be better prevented from moving substantially toward the vehicle front, thus enabling the rear garnish 70 to be further suppressed or prevented from flying off (falling) into the vehicle cabin 14.

The head protection airbag 80 is stowed in the A pillar 20 in the vicinity of a door opening (opening trim 48). This thereby enables the head protection airbag 80 to inflate and deploy speedily at the side of the occupant (driver), and thus provide appropriate restraint of the occupant (driver), at a time of a collision of the vehicle 12.

The A pillar 20 according to the present exemplary embodiment includes the transparent A pillar outer glass 50. This thereby enables the driver (occupant) to view the situation at the exterior of the A pillar 20 through the A pillar outer glass 50 between the front garnish 60 (first column 30) and the rear garnish 70 (second column 40).

Explanation has been given regarding the front pillar structure 10 according to the present exemplary embodiment with reference to the drawings. However, the front pillar structure 10 according to the present exemplary embodiment is not limited to the illustrations, and the design thereof may be modified as appropriate within a range not departing from the scope of the present disclosure. For example, plural jutting-out portions 76 may be provided in a row.

Moreover, the peripheral edge 24F at the vehicle front of the cover 24 may be abutted against the second side wall 62B of the main body 62 of the front garnish 60 and joined thereto using clips or the like. Similarly the peripheral edge 24B at the vehicle rear of the cover 24 may be abutted against the first side wall 72A of the main body 72 of the rear garnish 70 and joined thereto using clips or the like. Namely, the cover 24 may be configured so as to couple the front garnish 60 (main body 62) and the rear garnish 70 (main body 72) together.

In the exemplary embodiment described above, the wire harness 84 and the hose 86 are housed in the housing space Sf between the front garnish 60 and the first column 30. However, there is no limitation thereto. Configuration may be made in which only one out of the wire harness 84 or the hose 86 is housed in the housing space Sf.

What is claimed is:

1. A front pillar structure comprising:
a front frame member extending substantially along a vehicle vertical direction;
a rear frame member extending substantially along the vehicle vertical direction:
a transparent member extending substantially along the vehicle vertical direction, a vehicle front-rear direction front side of the transparent member being supported by the front frame member, and a vehicle front-rear direction rear side of the transparent member being supported by the rear frame member;
a front interior decorative member extending substantially along the vehicle vertical direction and covering the front frame member from a vehicle interior side;
a rear interior decorative member extending substantially along the vehicle vertical direction and covering the rear frame member from the vehicle interior side;
a head protection airbag, at least part of which is stowed between the rear frame member and the rear interior decorative member, the head protection airbag being inflated and deployed in a curtain shape at a side section of a vehicle cabin due to gas being supplied at a time of a vehicle collision;
a cover disposed between a lower end portion of the front interior decorative member and a lower end portion of the rear interior decorative member, the cover being configured to form a part of an instrument panel; and
a jutting-out portion provided so as to jut out from the lower end portion of the rear interior decorative member toward a lower face side of the cover.

2. The front pillar structure of claim 1, wherein the jutting-out portion is formed with a substantially L-shaped profile in side view as viewed along a vehicle width direction.

3. The front pillar structure of claim 1, wherein:
the rear interior decorative member is formed with a substantially U-shaped profile opening toward a vehicle width direction outer side in plan view cross-section; and
the jutting-out portion juts out from a vehicle width direction outer end portion at a vehicle front of the rear interior decorative member.

4. The front pillar structure of claim 2, wherein:
the rear interior decorative member is formed with a substantially U-shaped profile opening toward a vehicle width direction outer side in plan view cross-section; and
the jutting-out portion juts out from a vehicle width direction outer end portion at a vehicle front of the rear interior decorative member.

* * * * *